United States Patent
Collins et al.

(10) Patent No.: US 7,231,040 B1
(45) Date of Patent: Jun. 12, 2007

(54) MULTIPRIME RSA PUBLIC KEY CRYPTOSYSTEM

(75) Inventors: Thomas Collins, Saratoga, CA (US); Dale Hopkins, Gilroy, CA (US); Susan Langford, Sunnyvale, CA (US); Michael Sabin, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/328,726

(22) Filed: Oct. 26, 1998

Related U.S. Application Data

(63) Continuation of application No. 08/784,453, filed on Jan. 16, 1997, now Pat. No. 5,848,159.

(60) Provisional application No. 60/033,271, filed on Dec. 9, 1996.

(51) Int. Cl.
*H04K 1/00* (2006.01)
*H04L 9/00* (2006.01)

(52) U.S. Cl. .............................. 380/28; 713/200
(58) Field of Classification Search ............. 380/30, 380/28, 282, 259; 713/200, 201
See application file for complete search history.

(56) References Cited

U.S. PATENT DOCUMENTS

| | | | |
|---|---|---|---|
| 4,200,770 A | 4/1980 | Hellman et al. | 170/22 |
| 4,218,582 A | 8/1980 | Hellman et al. | 170/22 |
| 4,405,829 A * | 9/1983 | Rivest et al. | 178/22.1 |
| 4,424,414 A | 1/1984 | Hellman et al. | 170/22.1 |
| 4,514,592 A | 4/1985 | Miyaguchi | 178/22.11 |
| 4,995,082 A | 2/1991 | Schnorr | 380/23 |
| 5,046,094 A | 9/1991 | Kawamura et al. | 380/46 |
| 5,046,194 A * | 9/1991 | Alaniz et al. | 380/46 |
| 5,321,752 A | 6/1994 | Iwamura et al. | 380/24 |
| 5,351,298 A | 9/1994 | Smith | |
| 5,761,310 A * | 6/1998 | Naciri | 380/30 |
| 5,848,159 A * | 12/1998 | Collins et al. | 380/30 |
| 5,974,151 A * | 10/1999 | Slavin | 380/30 |

OTHER PUBLICATIONS

Quisquater et al, Fast Decipherment Algorithm for RSA Public-Key Cryptosystem, Oct. 14, 1982, Electronics Letters, vol. 18 No. 21, pp. 905-907.*
Menezes et al, Handbook of Applied Cryptography, Oct. 17, 1996, pp. 89 and 613.*
Menezes et al, Handbook of Applied Cryptography, Oct. 16, 1996, pp. 68, 69, 283-287, 610-618.*
Ding, Pei, and Salomaa, The Chinese Remainder Theorem World Scientific 1996.*
Lidl and Pilz Applied Abstract Algebra, Undergraduate Texts in Mathematics, Springer 1984.*
Nemo, RSA Moduli Should Have 3 Prime Factors, Aug. 1996.*

(Continued)

*Primary Examiner*—Kim Vu
*Assistant Examiner*—Paula Klimach

(57) ABSTRACT

A method and apparatus are disclosed for improving public key encryption and decryption schemes that employ a composite number formed from three or more distinct primes. The encryption or decryption tasks may be broken down into sub-tasks to obtain encrypted or decrypted sub-parts that are then combined using a form of the Chinese Remainder Theorem to obtain the encrypted or decrypted value. A parallel encryption/decryption architecture is disclosed to take advantage of the inventive method.

100 Claims, 2 Drawing Sheets

OTHER PUBLICATIONS

Quisquater and Couvreur, Fast Decipherment Algorithm For RSA Public Key Cryptosystem, Electronic letters, Oct. 1982, pp. 905-907.*

Rivest et al. A Method for Obtaining Digital Signatures and Public-Key Cryptosystems.*

Richar Schroeppel, Copyleft for Scientific Papers, Mar. 3, 1994.*

Bruce Schneier: "Applied Cryptography" Second Edition, Jan. 1, 1996, John Wiley & sons, USA, XP002283138, pp. 466-474.

European Search Report, dated Oct. 11, 2004; App No. EP 95 3075.

*IEEE 1994 Electronics Letters Online No: 19941450 "Using four-prime RSA in which some of the bits are specified"* S.A. Vanstone and R.J. Zuccherat—Electronics Letters Dec. 8, 1994 vol. 30, No. 24, pp. 2118, 2119.

*RSA '98 Presentation—F. Levy-dit-Vehel—Jan. 98 "Stuffing An RSA Into The Smallest 68HC05"*, pp. 1-14.

*Generating a Product of Three Primes With an Unknown Factorization*, Dan Boneh and Jeremy Horwitz, Computer Science Department, Stanford University.

*ChipCenter: The Web's Definitive Electronics Resource—"Compaq Computer Corporation—WebScan :Press Release"* (Apr. 11, 2000).

*Newell Public Relations, Hong Kong—"RSA Security teams with Compaq to provide high-speed cryptography breakthrough for manufacturers of wireless and embedded devices"* (Apr. 19, 2000).

*Compaq News via WebLibrary—"New RSA BSAFE Crypto-C Encryption Software Offers up to 500 Percent Performance Gains for E-Commerce, Secure E-Mail and Other Applications"* PR News Wire via DowVision (Sep. 6, 2000).

*Compaq News via WebLibrary—"RSA Security Releases RSA Encryption Algorithm into Public Domain"* PR News Wire via DowVision (Sep. 6, 2000).

*RSA Security—RSA BSAFE★ —Wireless Transport Layer Security for C* (Aug. 31, 2000).

*CyberLaw Presents: The RSA Algorithm & The RSA Patent—"Using the RSA Algorithm for Encryption and Digital Signatures: Can You Encrypt, Decrypt, Sign and Verify without Infringing the RSA?"* Patrick J. Flinn and James M. Jordan III★; (c) 1997 Alston & Bird LLP (Jul. 9, 1997).

*RSA Laboratories / Bulletin 13* (Apr. 2000) *"A Cost-Based Security Analysis of Symmetric and Asymmetric Key Lengths"* Robert D. Silverman, RSA Laboratories.

*1982 International Symposium on Information Theory*; Les Arcs, France (Jun. 21-25, 1982).

*Lecture Notes in Computer Science* (Edited by G. Goos and J. Hartmanis) —*"Advances in Cryptology—CRYPTO 86" Proceedings*.

"An Introduction to Fast Generation of Large Prime Numbers" by C. Couvreur and J.J. Quisquater; Phillips J. Res. 37, 231-264, 1982.

"A Method for Obtaining Digital Signatures and Public Key Cryptosystems" R.L. Rivest, A. Shamir, and L. Adelman, MIT Laboratory for Computer Science and Department of Mathematics.

*MIT/LCS/TR-212—"Digitalized Signatures and Public-Key Functions As Intractable As Factorization"* Michael O. Rabin (Jan. 1979) Massachusetts Institute of Technology Laboratory for Computer Science.

*Permutation Polynomials in RSA-Cryptosystems* Rudolf Lidl and Winfried B. Muller; Department of Mathematics, University of Tasmania, Hobart Australia 7001 and Institut für Mathematik, Universität Klagenfurt, A-9020 Klagenfurt, Austria.

*PKCS #1: RSA Encryption Standart—An RSA Laboratories Technical Note*, Version 1.5, Revised Nov. 1, 1993.

*High-Speed RSa Implementation* Cetin Kaya Koc, RSA Laboratories RSA Data Security, Inc., 100 Marine Parkway, Suite 500, Redwood City CA 94065-1031; Copyright © RSA Laboratories Version 2.0—Nov. 1994.

International Search Report (PCT).

*RSI Moduli Should Have 3 Prime Factors★* by Captain Nemo.

\* cited by examiner

MULTIPRIME RSA PUBLIC KEY CRYPTOSYSTEM

CLAIM OF PRIORITY

This is a Continuation of application Ser. No. 08/784,453, filed Jan. 16, 1997 and incorporated herein by reference. This application also claims the benefit of U.S. Provisional Application No. 60/033,271 for PUBLIC KEY CRYPTOGRAPHIC APPARATUS AND METHOD, filed Dec. 9, 1996, naming as inventors, Thomas Collins, Dale Hopkins, Susan Langford and Michael Sabin, the disclosure of which is incorporated by reference.

BACKGROUND OF THE INVENTION

This invention relates generally to communicating data in a secure fashion, and more particularly to a cryptographic system and methods using public key cryptography.

Computer systems are found today in virtually every walk of life for storing, maintaining, and transferring various types of data. The integrity of large portions of this data, especially that portion relating to financial transactions, is vital to the health and survival of numerous commercial enterprises. Indeed, as open and unsecured data communications channels for sales transactions gain popularity, such as credit card transactions over the Internet, individual consumers have an increasing stake in data security.

Thus, for obvious reasons, it is important that financial transaction communications pass from a sender to an intended receiver without intermediate parties being able to interpret the transferred message.

Cryptography, especially public key cryptography, has proven to be an effective and convenient technique of enhancing data privacy and authentication. Data to be secured, called plaintext, is transformed into encrypted data, or ciphertext, by a predetermined encryption process of one type or another. The reverse process, transforming ciphertext into plaintext, is termed decryption. Of particular importance to this invention is that the processes of encryption and decryption are controlled by a pair of related cryptographic keys. A "public" key is used for the encryption process, and a "private" key is used to decrypt ciphertext. The public key transforms plaintext to ciphertext, but cannot be used to decrypt the ciphertext to retrieve the plaintext therefrom.

As an example, suppose a Sender A wishes to send message M to a recipient B. The idea is to use public key E and related private key D for encryption and decryption of M. The public key E is public information while D is kept secret by the intended receiver. Further, and importantly, although E is determined by D, it is extremely difficult to compute D from E. Thus the receiver, by publishing the public key E, but keeping the private key D secret, can assure senders of data encrypted using E that anyone who intercepts the data will not be able to decipher it. Examples of the public key/private key concept can be found in U.S. Pat. Nos. 4,200,770, 4,218,582, and 4,424,414.

The prior art includes a number of public key schemes, in addition to those described in the above-identified patents. Over the past decade, however, one system of public key cryptography has gained popularity. Known generally as the "RSA" scheme, it is now thought by many to be a worldwide defacto standard for public key cryptography. The RSA scheme is described in U.S. Pat. No. 4,405,829 which is fully incorporated herein by this reference.

The RSA scheme capitalizes on the relative ease of creating a composite number from the product of two prime numbers whereas the attempt to factor the composite number into its constituent primes is difficult. The RSA scheme uses a public key E comprising a pair of positive integers n and e, where n is a composite number of the form $$n = p \cdot q \tag{1}$$

where p and q are different prime numbers, and e is a number relatively prime to (p−1) and (q−1); that is, e is relatively prime to (p−1) or (q−1) if e has no factors in common with either of them. Importantly, the sender has access to n and e, but not to p and q. The message M is a number representative of a message to be transmitted wherein $$0 \leq M \leq n-1. \tag{2}$$

The sender enciphers M to create ciphertext C by computing the exponential $$C \equiv M^e \pmod{n}. \tag{3}$$

The recipient of the ciphertext C retrieves the message M using a (private) decoding key D, comprising a pair of positive integers d and n, employing the relation $$M \equiv C^d \pmod{n} \tag{4}$$

As used in (4), above, d is multiplicative inverse of $$e(\mathrm{mod}(\mathrm{lcm}((p-1), (q-1)))) \tag{5}$$

so that $$e \cdot d \equiv 1 (\mathrm{mod}(\mathrm{lcm}(p-1), (q-1)))) \tag{6}$$

where lcm((p−1), (q−1)) is the least common multiple of numbers p−1 and q−1. Most commercial implementations of RSA employ a different, although equivalent, relationship for obtaining d:

$$d \equiv e^{-1} \mathrm{mod}((p-1)(q-1)). \tag{7}$$

This alternate relationship simplifies computer processing.

Note: Mathematically (6) defines a set of numbers and (7) defines a subset of that set. For implementation, (7) or (6) usually is interpreted to mean d is the smallest positive element in the set.)

The net effect is that the plaintext message M is encoded knowing only the public key E (i.e., e and n). The resultant ciphertext C can only decoded using decoding key D. The composite number n, which is part of the public key E, is computationally difficult to factor into its components, prime numbers p and q, a knowledge of which is required to decrypt C.

From the time a security scheme, such as RSA, becomes publicly known and used, it is subjected to unrelenting attempts to break it. One defense is to increase the length (i.e., size) of both p and q. Not long ago it was commonly recommended that p and q should be large prime numbers 75 digits long (i.e., on the order of $10^{75}$). Today, it is not uncommon to find RSA schemes being proposed wherein the prime numbers p and q are on the order of 150 digits long. This makes the product of p and q a 300 digit number. (There are even a handful of schemes that employ prime numbers (p and q) that are larger, for example 300 digits long to form a 600 digit product.) Numbers of this size, however, tend to require enormous computer resources to perform the encryption and decryption operations. Consider that while computer instruction cycles are typically mea sured in nanoseconds (billionths of seconds), computer computations of RSA steps are typically measured in milliseconds (thousandths of seconds). Thus millions of computer cycles are required to compute individual RSA steps resulting in noticeable delays to users.

This problem is exacerbated if the volume of ciphertext messages requiring decryption is large—such as can be expected by commercial transactions employing a mass communication medium such as the Internet. A financial institution may maintain an Internet site that could conceivably receive thousands of enciphered messages every hour that must be decrypted, and perhaps even responded to. Using larger numbers to form the keys used for an RSA scheme can impose severe limitations and restraints upon the institution's ability to timely respond.

Many prior art techniques, while enabling the RSA scheme to utilize computers more efficiently, nonetheless have failed to keep pace with the increasing length of n, p, and q.

Accordingly, it is an object of this invention to provide a system and method for rapid encryption and decryption of data without compromising data security.

It is another object of this invention to provide a system and method that increases the computational speed of RSA encryption and decryption techniques.

It is still another object of this invention to provide a system and method for implementing an RSA scheme in which the factors of n do not increase in length as n increases in length.

It is still another object to provide a system and method for utilizing multiple (more than two), distinct prime number factors to create n.

It is a further object to provide a system and method for providing a technique for reducing the computational effort for calculating exponentiations in an RSA scheme for a given length of n.

SUMMARY OF THE INVENTION

The present invention discloses a method and apparatus for increasing the computational speed of RSA and related public key schemes by focusing on a neglected area of computation inefficiency. Instead of n=p·q, as is universal in the prior art, the present invention discloses a method and apparatus wherein n is developed from three or more distinct prime numbers; i.e., $n = p_1 \cdot p_2 \cdot \ldots \cdot p_k$, where k is an integer greater than 2 and $p_1, p_2, \ldots, p_k$ are sufficiently large distinct primes. Preferably, "sufficiently large primes" are prime numbers that are numbers approximately 150 digits long or larger. The advantages of the invention over the prior art should be immediately apparent to those skilled in this art. If, as in the prior art, p and q are each on the order of, say, 150 digits long, then n will be on the order of 300 digits long. However, three primes $p_1$, $p_2$, and $p_3$ employed in accordance with the present invention can each be on the order of 100 digits long and still result in n being 300 digits long. Finding and verifying 3 distinct primes, each 100 digits long, requires significantly fewer computational cycles than finding and verifying 2 primes each 150 digits long.

The commercial need for longer and longer primes shows no evidence of slowing; already there are projected requirements for n of about 600 digits long to forestall incremental improvements in factoring techniques and the ever faster computers available to break ciphertext. The invention, allowing 4 primes each about 150 digits long to obtain a 600 digit n, instead of two primes about 300 digits long, results in a marked improvement in computer performance. For, not only are primes that are 150 digits in size easier to find and verify than ones on the order of 300 digits, but by applying techniques the inventors derive from the Chinese Remainder Theorem (CRT), public key cryptography calculations for encryption and decryption are completed much faster—even if performed serially on a single processor system. However, the inventors' techniques are particularly adapted to advantageously apply RSA public key cryptographic operations to parallel computer processing.

The present invention is capable of extending the RSA scheme to perform encryption and decryption operation using a large (many digit) n much faster than heretofore possible. Other advantages of the invention include its employment for decryption without the need to revise the RSA public key encryption transformation scheme currently in use on thousands of large and small computers.

A key assumption of the present invention is that n, composed of 3 or more sufficiently large distinct prime numbers, is no easier (or not very much easier) to factor than the prior art, two prime number n. The assumption is based on the observation that there is no indication in the prior art literature that it is "easy" to factor a product consisting of more than two sufficiently large, distinct prime numbers. This assumption may be justified given the continued effort (and failure) among experts to find a way "easily" to break large composite numbers into their large prime factors. This assumption is similar, in the inventors' view, to the assumption underlying the entire field of public key cryptography that factoring composite numbers made up of two distinct primes is not "easy." That is, the entire field of public key cryptography is based not on mathematical proof, but on the assumption that the empirical evidence of failed sustained efforts to find a way systematically to solve NP problems in polynomial time indicates that these problems truly are "difficult."

The invention is preferably implemented in a system that employs parallel operations to perform the encryption, decryption operations required by the RSA scheme. Thus, there is also disclosed a cryptosystem that includes a central processor unit (CPU) coupled to a number of exponentiator elements. The exponentiator elements are special purpose arithmetic units designed and structured to be provided message data M, an encryption key e, and a number n (where $n = p_1 \cdot p_2 \cdot \ldots \cdot p_k$, k being greater than 2) and return ciphertext C according to the relationship, $$C \equiv M^e \pmod{n}.$$

Alternatively, the exponentiator elements may be provided the ciphertext C, a decryption (private) key d and n to return M according to the relationship, $$M \equiv C^d \pmod{n}.$$

According to this decryption aspect of the invention, the CPU receives a task, such as the requirement to decrypt cyphertext data C. The CPU will also be provided, or have available, a public key e and n, and the factors of n ($p_1$, $p_2, \ldots, p_k$). The CPU breaks the decryption task down into a number of sub-tasks, and delivers the sub-tasks to the exponentiator elements. The results of the sub-tasks are returned by the exponentiator elements to the CPU which, using a form of the CRT, combines the results to obtain the message data M. An encryption task may be performed essentially in the same manner by the CPU and its use of the exponentiator elements. However, usually the factors of n are not available to the sender (encryptor), only the public key, e and n, so that no sub-tasks are created.

In a preferred embodiment of this latter aspect of the invention, the bus structure used to couple the CPU and exponentiator elements to one another is made secure by encrypting all important information communicated thereon. Thus, data sent to the exponentiator elements is passed through a data encryption unit that employs, preferably, the ANSI Data Encryption Standard (DES). The exponentiator elements decrypt the DES-encrypted sub-task information they receive, perform the desired task, and encrypt the result, again using DES, for return to the CPU.

DETAILED DESCRIPTION OF PREFERRED EMBODIMENTS

Figure 1:
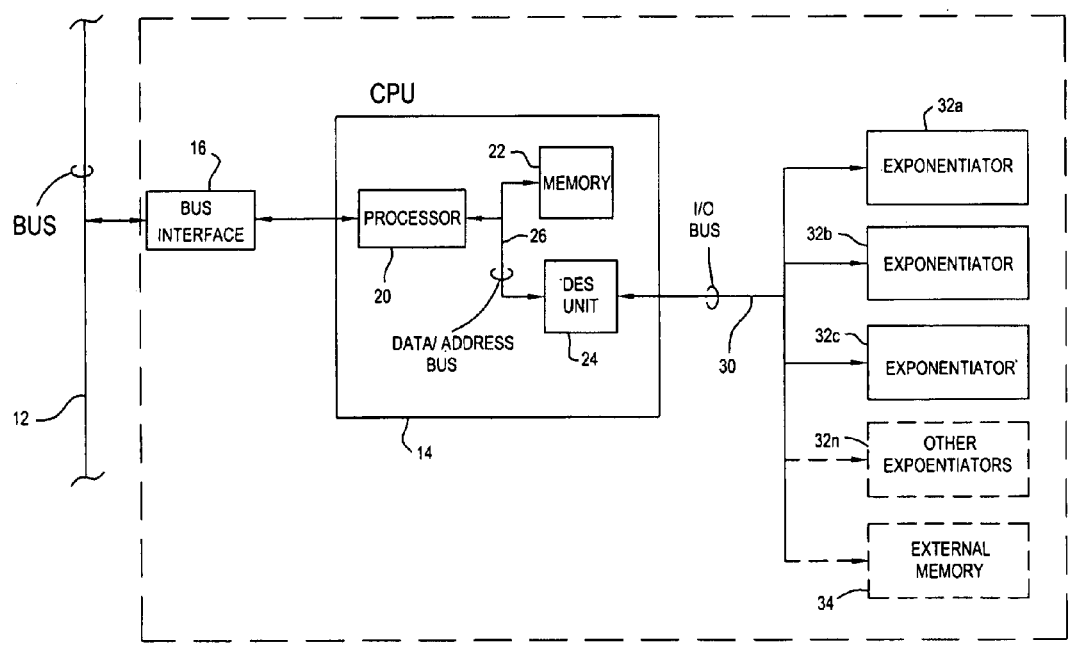
FIG. 1 is a simplified block diagram of a cryptosystem architecture configured for use in the present invention.

As indicated above, the present invention is employed in the context of the RSA public key encryption/decryption scheme. As also indicated, the RSA scheme obtains its security from the difficulty of factoring large numbers, and the fact that the public and private keys are functions of a pair of large (100–200 digits or even larger) prime numbers. Recovering the plaintext from the public key and the ciphertext is conjectured to be equivalent to factoring the product of two primes.

According to the present invention, the public key portion e is picked. Then, three or more random large, distinct prime numbers, $p_1, p_2, \ldots, p_k$ are developed and checked to ensure that each of $(p_1-1), (p_2-1), \ldots, (p_k-1)$ is relatively prime to e. Preferably, the prime numbers are of equal length. Then, the product $n = p_1 \cdot p_2 \cdot \ldots \cdot p_k$ is computed.

Finally, the decryption exponent, d, is established by the relationship:

$$d \equiv e^{-1} \bmod ((p_1-1)(p_2-1) \ldots (p_k-1)).$$

The message data, M is encrypted to ciphertext C using relationship (3), reprinted below.

$$C \equiv M^e \pmod{n}.$$

To decrypt the ciphertext, C, the relationship of (4), reprinted below, is used:

$$M \equiv C^d \pmod{n}$$

where n and d are those values identified above.

Using the present invention involving three primes to develop the product n, RSA encryption and decryption time can be substantially less than an RSA scheme using two primes by dividing the encryption or decryption task into sub-tasks, one sub-task for each distinct prime. (However, breaking the encryption or decryption into subtasks requires knowledge of the factors of n. This knowledge is not usually available to anyone except the owner of the key, so the encryption process can be accelerated only in special cases, such as encryption for local storage. A system encrypting data for another user performs the encryption process according to relationship (3), independent of the number of factors of n. Decryption, on the other hand, is performed by the owner of a key, so the factors of n are generally known and can be used to accelerate the process.) For example, assume that three distinct primes, $p_1$, $p_2$, and $p_3$, are used to develop the product n. Thus, decryption of the ciphertext, C, using the relationship $$M \equiv C^d \pmod{n}$$

is used to develop the decryption sub-tasks:

$$M_1 \equiv C_1^{d_1} \pmod{p_1},$$

$$M_2 \equiv C_2^{d_2} \pmod{p_2},$$

$$M_3 \equiv C_3^{d_3} \pmod{p_3},$$

where
  $C_1 \equiv C \pmod{p_1}$,
  $C_2 \equiv C \pmod{p_2}$,
  $C_3 \equiv C \pmod{p_3}$,
  $d_1 \equiv d \pmod{(p_1-1)}$,
  $d_2 \equiv d \pmod{(p_2-1)}$, and
  $d_3 \equiv d \pmod{(p_3-1)}$.

The results of each sub-task, $M_1$, $M_2$, and $M_3$ can be combined to produce the plaintext, M, by a number of techniques. However, it is found that they can most expeditiously be combined by a form of the Chinese Remainder Theorem (CRT) using, preferably, a recursive scheme. Generally, the plaintext M is obtained from the combination of the individual sub-tasks by the following relationship:

$$Y_i \equiv Y_{i-1} + [(M_i - Y_{i-1})(w_i^{-1} \bmod p_i) \bmod p_i] \cdot w_i \bmod n$$

where
  $2 \leq i \leq k$, and $$M = Y_k, Y_1 = M_1, \text{ and } w_i = \prod_{j<i} p_j.$$

Encryption is performed in much the same manner as that used to obtain the plaintext M, provided (as noted above) the factors of n are available. Thus, the relationship $$C \equiv M^e \pmod{n},$$

can be broken down into the three sub-tasks, $$C_1 \equiv M_1^{e_1} \pmod{p_1},$$

$$C_2 \equiv M_2^{e_2} \pmod{p_2},$$

$$C_3 \equiv M_3^{e_3} \pmod{p_3},$$

where
  $M_1 \equiv M \pmod{p_1}$,
  $M_2 \equiv M \pmod{p_2}$,
  $M_3 \equiv M \pmod{p_3}$,
  $e_1 \equiv e \pmod{(p_1-1)}$,
  $e_2 \equiv e \pmod{(p_2-1)}$, and
  $e_3 \equiv e \pmod{(p_3-1)}$.

In generalized form, the encrypted message C can be obtained by a recursive scheme as identified above to obtain the ciphertext C from its contiguous constituent sub-tasks $C_i$.

Preferably, the recursive CRT method described above is used to obtain either the ciphertext C, or the deciphered plaintext (message) M due to its speed. However, there may be implementations when it is beneficial to use a non-recursive technique in which case the following relationships are used:

$$M \equiv \sum_{i=1}^{k} M_i(w_i^{-1} \bmod p_i) w_i \bmod n$$

k is the number (3 or more) of distinct primes chosen to develop the product n.

Thus, for example above (k=3), M is constructed from the returned sub-task values $M_1$, $M_2$, $M_3$ by the relationship $$M \equiv M_1 \ (w_1^{-1} \bmod p_1) \ w_1 \bmod n + M_2 \ (w_2^{-1} \bmod p_2)$$
$$w_2 \bmod n + M_3 \ (w_3^{-1} \bmod p_3) \ w_3 \bmod n$$

where $w_1 = p_2 \ p_3$, $w_2 = p_1 \ p_3$, and $w_3 = p_1 p_2$.

Employing the multiple distinct prime number technique of the present invention in the RSA scheme can realize accelerated processing over that using only two primes for the same size n. The invention can be implemented on a single processor unit or even the architecture disclosed in the above-referenced U.S. Pat. No. 4,405,829. The capability of developing sub-tasks for each prime number is particularly adapted to employing a parallel architecture such as that illustrated in FIG. 1.

Turning to FIG. 1, there is illustrated a cryptosystem architecture apparatus capable of taking particular advantage of the present invention. The cryptosystem, designated with the reference numeral 10, is structured to form a part of a larger processing system (not shown) that would deliver to the cryptosystem 10 encryption and/or decryption requests, receiving in return the object of the request—an encrypted or decrypted value. The host would include a bus structure 12, such as a peripheral component interface (PCI) bus for communicating with the cryptosystem 10.

As FIG. 1 shows, The cryptoprocessor 10 includes a central processor unit (CPU) 14 that connects to the bus structure 12 by a bus interface 16. The CPU 14 comprises a processor element 20, a memory unit 22, and a data encryption standard (DES) unit 24 interconnected by a data/address bus 26. The DES unit 24, in turn, connects to an input/output (I/O) bus 30 (through appropriate driver/receiver circuits—not shown).

The I/O bus 30 communicatively connects the CPU to a number of exponentiator elements 32a, 32b and 32c. Shown here are three exponentiator elements, although as illustrated by the "other" exponentiators 32n, additional exponentiator elements can be added. Each exponentiator element is a state machine controlled arithmetic circuit structure specifically to implement the relationship described above. Thus, for example, the exponentiator 32a would be provided the values $M_1$, $e_1$, and $p_1$ to develop $C_1$. Similarly, the exponentiator circuits 32b and 32c develop $C_2$ and $C_3$ from corresponding sub-task values $M_2$, $e_2$, $p_2$, $M_3$, $e_3$, and $p_3$.

Preferably, the CPU 14 is formed on a single integrated circuit for security reasons. However, should there be a need for more storage space than can be provided by the "onboard" memory 22, the bus 30 may also connect the CPU 14 to an external memory unit 34.

In order to ensure a secure environment, it is preferable that the cryptosystem 10 meet the Federal Information Protection Standard (FIPS) 140-1 level 3. Accordingly, the elements that make up the CPU 14 would be implemented in a design that will be secure from external probing of the circuit. However, information communicated on the I/O bus 30 between the CPU 14 and the exponentiator circuits 32 (and external memory 34—if present) is exposed. Consequently, to maintain the security of that information, it is first encrypted by the DES unit 24 before it is placed on the I/O bus 30 by the CPU 14. The exponentiator circuits 32, as well as the external memory 34, will also include similar DES units to decrypt information received from the CPU, and later to encrypt information returned to the CPU 14.

It may be that not all information communicated on the I/O bus 30 need be secure by DES encryption. For that reason, the DES unit 24 of the CPU 14 is structured to encrypt outgoing information, and decrypt incoming information, on the basis of where in the address space used by the cryptosystem the information belongs; that is, since information communicated on the I/O bus 30 is either a write operation by the CPU 14 to the memory 34, or a read operation of those elements, the addresses assigned to the secure addresses and non-secure addresses. Read or write operations conducted by the CPU 14 using secure addresses will pass through the DES unit 24 and that of the memory 34. Read or write operations involving non-secure addresses will by-pass these DES units.

Figure 2:
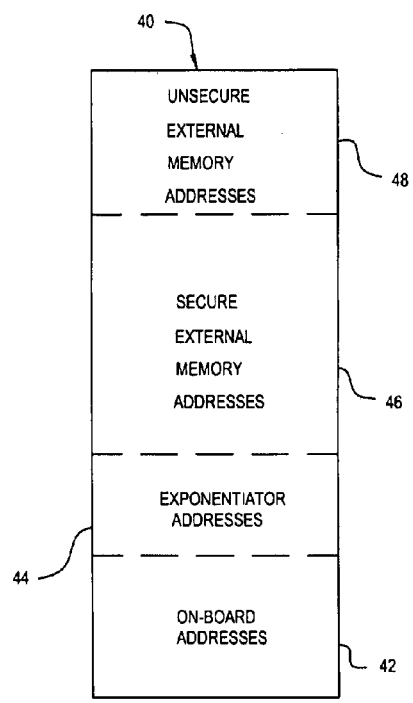
FIG. 2 is a memory map of the address space of the cryptosystem of FIG. 1.

FIG. 2 diagrammatically illustrates a memory map 40 of the address space of the cryptosystem 10 that is addressable by the processor 20. As the memory map 40 shows, an address range 40 provides addresses for the memory 22, and such other support circuitry (e.g., registers—not shown) that may form a part of the CPU 14. The addresses used to write information to, or read information from, the exponentiator elements 32 are in the address range 44 of the memory map 40. The addresses for the external memory 34 are in the address ranges 46, and 48. The address ranges 44 and 46 are for secure read and write operations. Information that must be kept secure, such as instructions for implementing algorithms, encryption/decryption keys, and the like, if maintained in external memory 34, will be stored at locations having addresses in the address range 46. Information that need not be secure such as miscellaneous algorithms data, general purpose instructions, etc. are kept in memory locations of the external memory 34 having addresses within the address range 48.

The DES unit 24 is structured to recognize addresses in the memory spaces 44, 46, and to automatically encrypt the information before it is applied to the I/O bus 30. The DES unit 24 is bypassed when the processor 20 accesses addresses in the address range 48. Thus, when the processor 20 initiates write operations to addresses within the memory space within the address range 46 (to the external memory 34), the DES unit 24 will automatically encrypt the information (not the addresses) and place the encrypted information on the I/O bus 30. Conversely, when the processor 20 reads information from the external memory 34 at addresses within the address range 46 of the external memory 34, the DES unit will decrypt information received from the I/O bus 30 and place the decrypted information on the data/address bus 26 for the processor 20.

In similar fashion, information conveyed to or retrieved from the exponentiators 32 by the processor 20 by write or read operations at addresses within the address range 44. Consequently, writes to the exponentiators 32 will use the DES unit 24 to encrypt the information. When that (encrypted) information is received by the exponentiators 32, it is decrypted by on-board DES units (of each exponentiator 32). The result of the task performed by the exponentiator 32 is then encrypted by the exponentiator's on-board DES unit, retrieved by the processor 20 in encrypted form and then decrypted by the DES unit 24.

Information that need not be maintained in secure fashion to be stored in the external memory 34, however, need only be written to addresses in the address range 48. The DES unit 24 recognizes writes to the address range 48, and bypasses the encryption circuitry, passing the information, in unencrypted form, onto the I/O bus 30 for storing in the external memory 34. Similarly, reads of the external memory 34 using addresses within the address range 48 are passed directly from the I/O bus 30 to the data/address bus 26 by the DES unit 24.

In operation, the CPU 14 will receive from the host it serves (not shown), via the bus 12, an encryption request. The encryption request will include the message data M to be encrypted and, perhaps, the encryption keys e and n (in the form of the primes $p_1, p_2, \ldots p_k$). Alternatively, the keys may be kept by the CPU 14 in the memory 22. In any event, the processor 20 will construct the encryption sub-tasks $C_1, C_2, \ldots, C_k$ for execution by the exponentiators 32.

Assume, for the purpose of the remainder of this discussion, that the encryption/decryption tasks performed by the cryptosystem 10, using the present invention, employs only three distinct primes, $p_1, p_2, p_3$. The processor 20 will develop the sub tasks identified above, using M, e, $p_1$ $p_2$, $p_3$. Thus, for example, if the exponentiator 32a were assigned the sub-task of developing $C_1$, the processor would develop the values $M_1$ and $e_1$ and deliver (write) these values, with $p_1$, to the exponentiator 32a. Similar values will be developed by the processor 20 for the sub-tasks that will be delivered to the exponentiators 32b and 32c.

In turn, the exponentiators 32 develop the values $C_1, C_2$, and $C_3$ which are returned to (retrieved by) the CPU 14. The processor 20 will then combine the values $C_1, C_2$, and $C_3$ to form C, the ciphertext encryption of M, which is then returned to the host via the bus 12.

Figure 3:
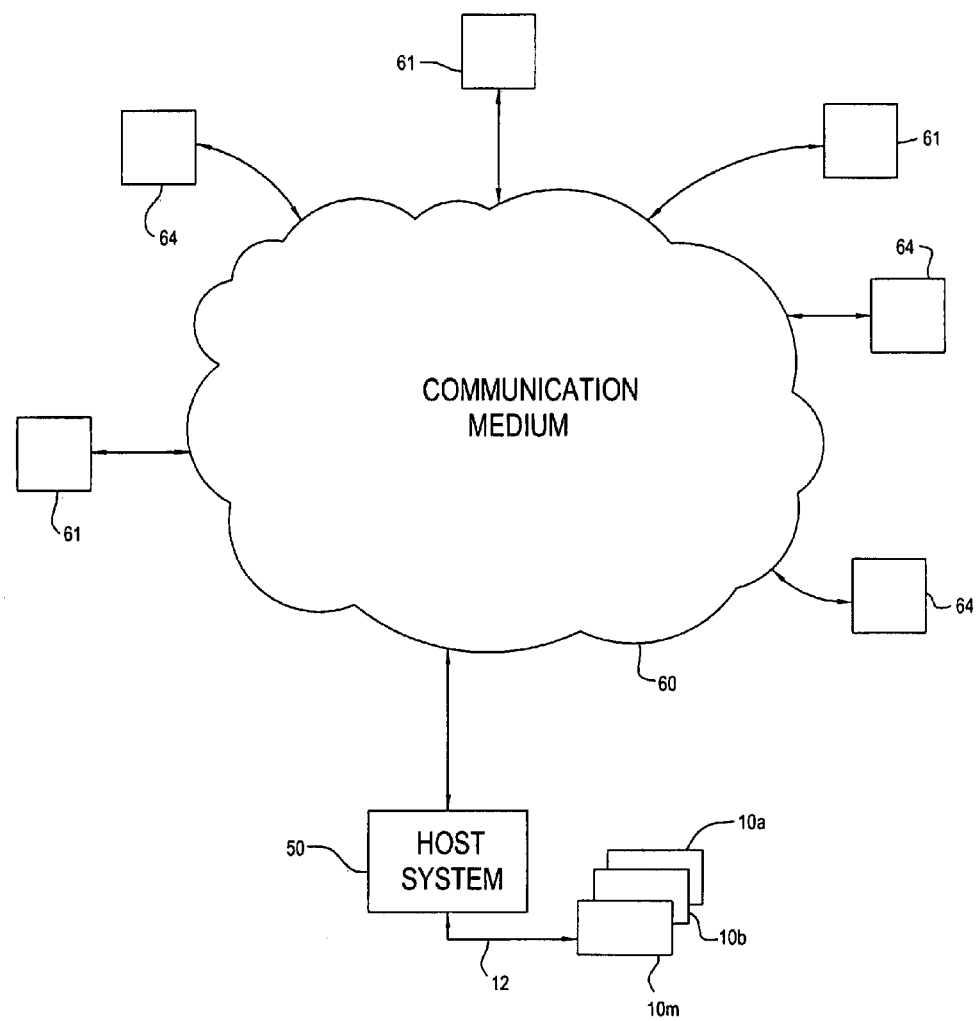
FIG. 3 is an exemplary illustration of one use of the invention.

The encryption, decryption techniques described hereinabove, and the use of the cryptosystem 10 (FIG. 1) can find use in a number of diverse environments. Illustrated in FIG. 3 is one such environment. FIG. 3 shows a host system 50, including the bus 12 connected to a plurality of cryptosystems 10 (10a, 10b, ..., 10m) structured as illustrated in FIG. 1, and described above. In turn, the host system 50 connects to a communication medium 60 which could be, for example, an internet connection that is also used by a number of communicating stations 64. For example, the host system 50 may be employed by a financial institution running a web site accessible, through the communication medium, by the stations 64. Alternatively, the communication medium may be implemented by a local area network (LAN) or other type network. Use of the invention described herein is not limited to the particular environment in which it is used, and the illustration in FIG. 3 is not meant to limit in any way how the invention can be used.

As an example, the host system, as indicated, may receive encrypted communication from the stations 64, via the communication medium 60. Typically, the data of the communication will be encrypted using DES, and the DES key will be encrypted using a public key by the RSA scheme, preferably one that employs three or more distinct prime numbers for developing the public and private keys.

Continuing, the DES encrypted communication, including the DES key encrypted with the RSA scheme, would be received by the host system. Before decrypting the DES communication, it must obtain the DES key and, accordingly, the host system 50 will issue, to one of the cryptosystems 10 a decryption request instruction, containing the encrypted DES key as the cyphertext C. If the (private) decryption keys, d, n (and its component primes, $p_1, p_2, \ldots, p_k$) are not held by the cryptosystem 10, they also will be delivered with the encryption request instruction.

In turn, the cryptosystem 10 would decrypt the received cyphertext in the manner described above (developing the sub-tasks, issuing the sub-tasks to the exponentiator 32 of the cryptosystem 10, and reassembling the results of the sub-task to develop the message data: the DES key), and return to the host system the desired, decrypted information.

Alternatively, the post-system 50 may desire to deliver, via the communication medium 60, an encrypted communication to one of the stations 64. If the communication is to be encrypted by the DES scheme, with the DES key encrypted by the RSA scheme, the host system would encrypt the communication, forward the DES key to one of the cryptosystems 10 for encryption via the RSA scheme. When the encrypted DES key is received back from the cryptosystem 10, the host system can then deliver to one or more of the stations 64 the encrypted message.

Of course, the host system 50 and the stations 64 will be using the RSA scheme of public key encryption/decryption. Encrypted communications from the stations 64 to the host system 50 require that the stations 64 have access to the public key E=(e,n) while the host system maintains the private key D=(d,n) and the constituent primes, $p_1, p_2, \ldots, p_k$). Conversely, for secure communication from the host system 50 to one or more of the stations 64, the host system 50 would retain a public key E' for each station 64, while the stations retain the corresponding private keys D'.

Other techniques for encrypting the communication could be used. For example, the communication could be entirely encrypted by the RSA scheme. If however, the message to be communicated is represented by a numerical value greater than n−1, it will need to be broken up into blocks of size M where 0≦M≦n−1.

$$0 \leq M \leq N-1.$$

Each block M would be separately encrypted/decrypted, using the public key/private key RSA scheme according to that described above.

The invention claimed is:

1. A processor-implemented method for establishing cryptographic communications, comprising the steps of:

encoding a plaintext message word M to a ciphertext word C, wherein M corresponds to a number representative of a message and wherein $$0 \leq M \leq n-1,$$

wherein n is a composite number formed by the product of $p_1 \cdot p_2 \cdot \ldots \cdot p_k$, k is an integer greater than 2 and $p_1, p_2, \ldots p_k$ are distinct random prime numbers, C is a number representative of an encoded form of message word M, and wherein said encoding step comprises transforming said message word M to said ciphertext word C, whereby $$C \equiv M^e \pmod{n},$$

and wherein e is a number relatively prime to $(p_1-1)$, $(p_2-1), \ldots,$ and $(p_k-1)$; and decoding said ciphertext word C to a receive message word M', said decoding step being performed using a decryption exponent d that is defined by $$d \equiv e^{-1} \bmod ((p_1-1)(p_2-1) \ldots (p_k-1)),$$

said decoding step including the further steps of,
defining a plurality of k sub-tasks in accordance with $M_1' \equiv C_1^{d_1} \pmod{p_1}$, $M_2' \equiv C_2^{d_2} \pmod{p_2}$,

. . .

$M_k' \equiv C_k^{d_k} \pmod{p_k}$, wherein
$C_1 \equiv C \pmod{p_1}$,
$C_2 \equiv C \pmod{p_2}$,
. . .
$C_k \equiv C \pmod{p_k}$,
$d_1 \equiv d \pmod{p_1-1}$,
$d_2 \equiv d \pmod{p_2-1}$, and
. . .
$d_k \equiv d \pmod{p_k-1}$, solving said sub-tasks to determine results $M_1'$, $M_2'$, ... $M_k'$, and combining said results of said sub-tasks to produce said receive message word M', wherein M'=M.

2. A processor-implemented method as recited in claim 1 wherein said step of combining said results of said sub-tasks includes a step of performing a recursive combining process to produce said receive message word M'.

3. A processor-implemented method as recited in claim 2 wherein said recursive combining process is performed in accordance with $Y_i \equiv Y_{i-1} + [(M_i' - Y_{i-1})(w_i^{-1} \bmod p_i) \bmod p_i] \cdot w_i \bmod n$, wherein $2 \le i \le k$, and $$M' = Y_k, Y_1 = M_1', \text{ and } w_i = \prod_{j<i} p_j.$$

4. A processor-implemented method as recited in claim 1 wherein said step of combining said results of said sub-tasks includes a step of performing a summation process to produce said receive message word M'.

5. A processor-implemented method as recited in claim 4 wherein said summation process is performed in accordance with $$M' \equiv \sum_{i=1}^{k} M_i'(w_i^{-1} \bmod p_i) w_i \bmod n,$$

where $$w_i = \prod_{j \ne i} p_j.$$

6. A processor-implemented method as recited in claim 1 wherein said step of solving said sub-tasks includes processing each of said sub-tasks by an associated one of a plurality of exponentiator units operating substantially simultaneously.

7. A processor-implemented method as recited in claim 1 wherein each of said distinct random prime numbers has the same number of bits.

8. A processor-implemented method as recited in claim 1 wherein the plurality of k sub-tasks are performed in parallel.

9. A processor-implemented method as recited in claim 8 wherein said step of combining uses a form of the Chinese Remainder Theorem (CRT).

10. A cryptographic communications system for establishing communications, comprising:

a communication medium;

encoding means coupled to said communication medium and adapted for transforming a transmit message word M to a ciphertext word C and for transmitting said ciphertext word C on said medium, wherein M corresponds to a number representative of a message, and $0 \le M \le n-1$, wherein n is a composite number of the form, $n = p_1 \cdot p_2 \cdot \ldots \cdot p_k$ wherein k is an integer greater than 2 and $p_1, p_2, \ldots$, and $p_k$ are distinct random prime numbers, and wherein said ciphertext word C corresponds to a number representative of an enciphered form of said message word M and corresponds to $C \equiv M^e \pmod{n}$, wherein e is a number relatively prime to $(p_1-1)$, $(p_2-1), \ldots$, and $(p_k-1)$; and decoding means communicatively coupled with said communication medium for receiving said ciphertext word C via said medium, said decoding means being operative to perform a decryption process for transforming said ciphertext word C to a receive message word M', wherein M' corresponds to a number representative of a deciphered form of C, said decryption process using a decryption exponent d that is defined by $d \equiv e^{-1} \bmod((p_1-1)(p_2-1)\ldots(p_k-1))$, said decryption process including the steps of
defining a plurality of k sub-tasks in accordance with $M_1' \equiv C_1^{d_1} \pmod{p_1}$, $M_2' \equiv C_2^{d_2} \pmod{p_2}$,

. . .

$M_k' \equiv C_k^{d_k} \pmod{p_k}$, wherein
$C_1 \equiv C \pmod{p_1}$,
$C_2 \equiv C \pmod{p_2}$,
. . .
$C_k \equiv C \pmod{p_k}$,
$d_1 \equiv d \pmod{p_1-1}$,
$d_2 \equiv d \pmod{p_2-1}$, and
. . .
$d_k \equiv d \pmod{p_k-1}$, solving said sub-tasks to determine results $M_1'$, $M_2'$, ... $M_k'$, and combining said results of said sub-tasks to produce said receive message word M', wherein M'=M.

11. A cryptographic communications system as recited in claim 10, wherein said decoding means is operative to combine said results of said sub-tasks by performing a recursive combining process to produce said receive message word M'.

12. A cryptographic communications system as recited in claim 11 wherein said decoding means is operative to perform said recursive combining process in accordance with $$Y_i \equiv Y_{i-1} + [(M_i' - Y_{i-1})(w_i^{-1} \bmod p_i) \bmod p_i] \cdot w_i \bmod n,$$

wherein $2 \leq i \leq k$, and $$M' = Y_k, Y_1 = M_1', \text{ and } w_i = \prod_{j<i} p_j.$$

13. A cryptographic communications system as recited in claim 10 wherein said decoding means is operative combine said results of said sub-tasks by performing a summation process to produce said receive message word M'.

14. A cryptographic communications system as recited in claim 13 wherein said decoding means is operative to perform said summation process accordance with $$M' \equiv \sum_{i=1}^{k} M_i'(w_i^{-1} \bmod p_i) w_i \bmod n,$$

where $$w_i = \prod_{j \neq i} p_j.$$

15. A cryptographic communications system as recited in claim 10 wherein said step of solving said sub-tasks includes processing each of said sub-tasks by an associated one of a plurality of exponentiator units operating substantially simultaneously.

16. A cryptographic communications system as recited in claim 10 wherein each of said distinct random prime numbers has the same number of bits.

17. A cryptographic communications system as recited in claim 10 wherein the plurality of k sub-tasks are performed in parallel.

18. A cryptographic communications system as recited in claim 17 wherein said step of combining uses a form of the Chinese Remainder Theorem (CRT).

19. A processor-implemented method for establishing cryptographic communications, comprising the steps of:
encoding a plaintext message word M to a ciphertext word C, wherein M corresponds to a number representative of a message, and $$0 \leq M \leq n-1,$$

n being a composite number formed from the product of $p_1 \cdot p_2 \cdot \ldots \cdot p_k$, wherein k is an integer greater than 2 and $p_1, p_2, \ldots p_k$ are distinct random prime numbers, and wherein the ciphertext word C is a number representative of an encoded form of message word M, wherein said step of encoding includes the steps of
defining a plurality of k sub-tasks in accordance with $C_1 \equiv M_1^{e_1} \pmod{p_1},$ $C_2 \equiv M_2^{e_2} \pmod{p_2},$

. . .

$C_k \equiv M_k^{e_k} \pmod{p_k},$ wherein
$M_1 \equiv M \pmod{p_1},$
$M_2 \equiv M \pmod{p_2},$
. . .
$M_k \equiv M \pmod{p_k},$
$e_1 \equiv e \pmod{p_1-1},$
$e_2 \equiv e \pmod{p_2-1},$ and
. . .
$e_k \equiv e \pmod{p_k-1},$
wherein e is a number relatively prime to $(p_1-1)$, $(p_2-1), \ldots,$ and $(p_k-1)$, solving said sub-tasks to determine results $C_1, C_2, \ldots C_k,$ and
combining said results of said sub-tasks to produce said ciphertext word C.

20. A processor-implemented method as recited in claim 19, wherein said step of combining said results of said subtasks includes a step of performing a recursive combining process to produce said ciphertext word C.

21. A processor-implemented method as recited in claim 20 wherein said recursive combining process is performed in accordance with $$Y_i \equiv Y_{i-1} + [(C_i - Y_{i-1}) (w_i^{-1} \bmod p_i) \bmod p_i] \cdot w_i \bmod n,$$

wherein $2 \leq i \leq k$, and $$C = Y_k, Y_1 = C_i, \text{ and } w_i = \prod_{j<i} p_j.$$

22. A processor-implemented method as recited in claim 19 wherein said step of combining said results of said sub-tasks includes a step of performing a summation process to produce said ciphertext word C.

23. A processor-implemented method as recited in claim 22 wherein said summation process is performed in accordance with $$C \equiv \sum_{i=1}^{k} C_i(w_i^{-1} \bmod p_i) w_i \bmod n,$$

where $$w_i = \prod_{j \neq i} p_j.$$

24. A processor-implemented method as recited in claim 19 wherein said step of solving said sub-tasks includes processing each of said sub-tasks by an associated one of a plurality of exponentiator units operating substantially simultaneously.

25. A processor-implemented method as recited in claim 19 wherein each of said distinct random prime numbers has the same number of bits.

26. A processor-implemented method as recited in claim 19 wherein the plurality of k sub-tasks are performed in parallel.

27. A processor-implemented method as recited in claim 26 wherein said step of combining uses a form of the Chinese Remainder Theorem (CRT).

28. A cryptographic communications system for establishing communications, comprising:

a communication medium;

a processor coupled to said communication medium and operative to transform a transmit message word M to a ciphertext word C, and to transmit said ciphertext word C on said medium, wherein M corresponds to a number representative of a message, and $0 \leq M \leq n-1$, n being a composite number formed from the product of $p_1 \cdot p_2 \cdot \ldots \cdot p_k$ wherein k is an integer greater than 2 and $p_1, p_2, \ldots, p_k$, are distinct random prime numbers, and wherein the ciphertext word C is a number representative of an encoded form of message word M, said processor being operative to transform said transmit message word M to said ciphertext word C by performing an encoding process comprising the steps of:

defining a plurality of k sub-tasks in accordance with $C_1 \equiv M_1^{e_1} \pmod{p_1}$, $C_2 \equiv M_2^{e_2} \pmod{p_2}$,

...

$C_k \equiv M_k^{e_k} \pmod{p_k}$, wherein $M_1 \equiv M \pmod{p_1}$, $M_2 \equiv M \pmod{p_2}$,

...

$M_k \equiv M \pmod{p_k}$, $e_1 \equiv e \pmod{p_1-1}$, $e_2 \equiv e \pmod{p_2-1}$, and

...

$e_k \equiv e \pmod{p_k-1}$, wherein e is a number relatively prime to $(p_1-1)$, $(p_2-1)$, ..., and $(p_k-1)$, solving said sub-tasks to determine results $C_1, C_2, \ldots C_k$, and combining said results of said sub-tasks to produce said ciphertext word C.

29. A cryptographic communications system as recited in claim 28, wherein said processor is operative to combine said results of said sub-tasks by performing a recursive combining process to produce said ciphertext word C.

30. A cryptographic communications system as recited in claim 29 wherein said processor is operative to perform said recursive combining process in accordance with $Y_i \equiv Y_{i-1} + [(C_i - Y_{i-1})(w_i^{-1} \bmod p_i) \bmod p_i] \cdot w_i \bmod n$, wherein $2 \leq i \leq k$, and $C = Y_k, Y_1 = C_1, \text{ and } w_i = \prod_{j<i} p_j$.

31. A cryptographic communications system as recited in claim 28 wherein said processor is operative to combine said results of said sub-tasks by performing a summation process to produce said message word C.

32. A cryptographic communications system as recited in claim 31 wherein said processor is operative to perform said summation process in accordance with $C \equiv \sum_{i=1}^{k} C_i (w_i^{-1} \bmod p_i) w_i \bmod n$, where $w_i = \prod_{j \neq i} p_j$.

33. A cryptographic communications system as recited in claim 28 wherein said step of solving said sub-tasks includes processing each of said sub-tasks by an associated one of a plurality of exponentiator units operating substantially simultaneously.

34. A cryptographic communications system as recited in claim 28 wherein each of said distinct random prime numbers has the same number of bits.

35. A cryptographic communications system as recited in claim 28 wherein the plurality of k sub-tasks are performed in parallel.

36. A cryptographic communications system as recited in claim 35 wherein said step of combining uses a form of the Chinese Remainder Theorem (CRT).

37. A digital signature system, comprising:

a communication medium;

digital signature generating means coupled to said communication medium and adapted for transforming a message word M to a signed ciphertext word C and for transmitting said signed ciphertext word C on said medium, wherein M corresponds to a number representative of a message, and $0 \leq M \leq n-1$, wherein n is a composite number of the form $n = p_1 \cdot p_2 \cdot \ldots \cdot p_k$, wherein k is an integer greater than 2 and $p_1, p_2, \ldots p_k$ are distinct random prime numbers, and wherein said signed ciphertext word C corresponds to a number representative of a signed form of said message word M and corresponds to $C \equiv M^d \pmod{n}$, wherein d is defined by $d \equiv e^{-1} \bmod ((p_1-1) \cdot (p_2-1) \cdot \ldots \cdot (p_k-1))$, and e is a number relatively prime to $(p_1-1), (p_2-1), \ldots,$ and $(p_k-1)$; and digital signature verification means communicatively coupled with said communication medium for receiving said signed ciphertext word C via said medium, and being operative to verify said signed ciphertext word C by performing the steps of, defining a plurality of k sub-tasks in accordance with $M_1' \equiv C_1^{d_1} \pmod{p_1}$, $M_2' \equiv C_2^{d_2} \pmod{p_2}$,

...

$M_k' \equiv C_k^{d_k} \pmod{p_k}$, wherein $C_1 \equiv C(\mod p_1)$, $C_2 \equiv C(\mod p_2)$,

. . .

$C_k \equiv C(\mod p_k)$, $e_1 \equiv e(\mod(p_1-1))$, $e_2 \equiv e(\mod(p_2-1))$, and

. . .

$e_k \equiv e(\mod(p_k-1))$, solving said sub-tasks to determine results $M_1'$, $M_2'$, . . . $M_k'$, and combining said results of said sub-tasks to produce said receive message word M', wherein M'=M.

38. A digital signature system as recited in claim 37 wherein said digital signature verification means is operative to combine said results of said sub-tasks by performing a recursive combining process to produce said receive message word M'.

39. A digital signature system as recited in claim 38 wherein said digital signature verification means is operative to perform said recursive combining process in accordance with $Y_i \equiv Y_{i-1} + [(M_i' - Y_{i-1})(w_i^{-1} \mod p_i) \mod p_i] \cdot w_i \mod n$, wherein $2 \leq i \leq k$, and $$M' = Y_k, Y_1 = M_1', \text{ and } w_i = \prod_{j<i} p_j.$$

40. A digital signature system as recited in claim 37 wherein said digital signature verification means is operative combine said results of said sub-tasks by performing a summation process to produce said receive message word M'.

41. A digital signature system as recited in claim 40 wherein said digital signature verification means is operative to perform said summation process accordance with $$M' \equiv \sum_{i=1}^{k} M_i'(w_i^{-1} \mod p_i) w_i \mod n,$$

where $$w_i = \prod_{j \neq i} p_j.$$

42. A digital signature system as recited in claim 37 wherein said step of solving said sub-tasks includes processing each of said sub-tasks by an associated one of a plurality of exponentiator units operating substantially simultaneously.

43. A digital signature system as recited in claim 37 wherein each of said distinct random prime numbers has the same number of bits.

44. A digital signature system as recited in claim 37 wherein the plurality of k sub-tasks are performed in parallel.

45. A digital signature system as recited in claim 44 wherein said step of combining uses a form of the Chinese Remainder Theorem (CRT).

46. A processor-implemented method for establishing cryptographic communications, comprising the steps of:

decoding a ciphertext word C to a message word M, wherein M corresponds to a number representative of a message and wherein $0 \leq M \leq n-1$, wherein n is a composite number formed by the product of $p_1 \cdot p_2 \cdot \ldots \cdot p_k$, k is an integer greater than 2 and $p_1, p_2, \ldots p_k$ are distinct random prime numbers, C is a number representative of an encoded form of message word M that is encoded by transforming said message word M to said ciphertext word C whereby $C \equiv M^e (\mod n)$, and wherein e is a number relatively prime to $(p_1-1)$, $(p_2-1), \ldots,$ and $(p_k-1)$;

said decoding step being performed using a decryption exponent d that is defined by $d \equiv e^{-1} \mod((p_1-1)(p_2-1) \ldots (p_k-1))$, wherein said step of decoding includes the steps of
defining a plurality of k sub-tasks in accordance with $M_1 \equiv C_1^{d_1} (\mod p_1)$, $M_2 \equiv C_2^{d_2} (\mod p_2)$,

. . .

$M_k \equiv C_k^{d_k} (\mod p_k)$, wherein $C_1 \equiv C(\mod p_1)$, $C_2 \equiv C(\mod p_2)$,

. . .

$C_k \equiv C(\mod p_k)$, $d_1 \equiv d(\mod(p_1-1))$, $d_2 \equiv d(\mod(p_2-1))$, and

. . .

$d_k \equiv d(\mod(p_k-1))$, solving said sub-tasks to determine results $M_1, M_2, \ldots M_k$, and combining said results of said sub-tasks to produce said message word M.

47. A processor-implemented method as recited in claim 46 wherein said step of combining said results of said sub-tasks includes a step of performing a recursive combining process to produce said message word M.

48. A processor-implemented method as recited in claim 47 wherein said recursive combining process is performed in accordance with $Y_i \equiv Y_{i-1} + [(M_i - Y_{i-1})(w_i^{-1} \mod p_i) \mod p_i] \cdot w_i \mod n$, wherein $2 \leq i \leq k$, and $$M' = Y_k, Y_1 = M_1', \text{ and } w_i = \prod_{j<i} p_j.$$

49. A processor-implemented method as recited in claim 46 wherein said step of combining said results of said sub-tasks includes a step of performing a summation process to produce said message word M.

50. A processor-implemented method as recited in claim 49 wherein said summation process is performed in accordance with $$M \equiv \sum_{i=1}^{k} M_i(w_i^{-1} \bmod p_i) w_i \bmod n,$$

where $$w_i = \prod_{j \neq i} p_j.$$

51. A cryptographic communications system as recited in claim 50 wherein said processor is operative to perform said recursive combining process in accordance with $$Y_i \equiv Y_{i-1} + [(M_i' - Y_{i-1})\ (w_i^{-1} \bmod p_i) \bmod p_i] \cdot w_i \bmod n,$$

wherein $2 \leq i \leq k$, and $$M = Y_k, Y_1 = M_1', \text{ and } w_i = \prod_{j<i} p_j.$$

52. A processor-implemented method as recited in claim 46 wherein said step of solving said sub-tasks includes processing each of said sub-tasks by an associated one of a plurality of exponentiator units operating substantially simultaneously.

53. A processor-implemented method as recited in claim 46 wherein each of said distinct random prime numbers has the same number of bits.

54. A processor-implemented method as recited in claim 46 wherein the plurality of k sub-tasks are performed in parallel.

55. A processor-implemented method as recited in claim 54 wherein said step of combining uses a form of the Chinese Remainder Theorem (CRT).

56. A cryptographic communications system for establishing communications, comprising:
a communication medium;
a processor communicatively coupled with said communication medium for receiving a ciphertext word C via said medium, and being operative to transform said ciphertext word C to a receive message word M', wherein a message M corresponds to a number representative of a message and wherein $0 \leq M \leq n-1$, wherein n is a composite number formed by the product of $p_1 \cdot p_2 \cdot \ldots \cdot p_k$, k is an integer greater than 2 and $p_1$, $p_2, \ldots p_k$ are distinct random prime numbers, and wherein said ciphertext word C is a number representative of an encoded form of said message word M that is encoded by transforming M to said ciphertext word C whereby, $C \equiv M^e \pmod{n}$, and wherein e is a number relatively prime to $(p_1-1)$, $(p_2-1), \ldots,$ and $(p_k-1)$; and
said processor being operative to perform a decryption process using a decryption exponent d that is defined by $d \equiv e^{-1} \bmod((p_1-1)\ (p_2-1) \ldots (p_k-1))$, said decryption process including the steps of
defining a plurality of k sub-tasks in accordance with $M_1' \equiv C_1^{d_1} \pmod{p_1}$, $M_2' \equiv C_2^{d_2} \pmod{p_2}$,

. . .

$M_k' \equiv C_k^{d_k} \pmod{p_k}$, wherein
$C_1 \equiv C \pmod{p_1}$,
$C_2 \equiv C \pmod{p_2}$,
. . .
$C_k \equiv C \pmod{p_k}$,
$d_1 \equiv d(\bmod(p_1-1))$,
$d_2 \equiv d(\bmod(p_2-1))$, and
. . .
$d_k \equiv d(\bmod(p_k-1))$,
solving said sub-tasks to determine results $M_1'$, $M_2', \ldots M_k'$, and
combining said results of said sub-tasks to produce said receive message word M', wherein M'=M.

57. A cryptographic communications system as recited in claim 56 wherein said processor is operative to combine said results of said sub-tasks by performing a recursive combining process to produce said receive message word M'.

58. A cryptographic communications system as recited in claim 56 wherein said processor is operative to combine said results of said sub-tasks by performing a summation process to produce said receive message word M'.

59. A cryptographic communications system as recited in claim 58 wherein said processor is operative to perform said summation process in accordance with $$M' \equiv \sum_{i=1}^{k} M_i'(w_i^{-1} \bmod p_i) w_i \bmod n,$$

where $$w_i = \prod_{j \neq i} p_j.$$

60. A cryptographic communications system as recited in claim 56 wherein said step of solving said sub-tasks includes processing each of said sub-tasks by an associated one of a plurality of exponentiator units operating substantially simultaneously.

61. A cryptographic communications system as recited in claim 56 wherein each of said distinct random prime numbers has the same number of bits.

62. A cryptographic communications system as recited in claim 56 wherein the plurality of k sub-tasks are performed in parallel.

63. A cryptographic communications system as recited in claim 62 wherein said step of combining uses a form of the Chinese Remainder Theorem (CRT).

64. A processor-implemented method for generating a digital signature, comprising the steps of:
signing a plaintext message word M to create a signed ciphertext word C, wherein M corresponds to a number representative of a message, and $0 \leq M \leq n-1$, n being a composite number formed from the product of $p_1 \cdot p_2 \cdot \ldots \cdot p_k$, wherein k is an integer greater than 2 and $p_1, p_2, \ldots p_k$ are distinct random prime numbers, and wherein the signed ciphertext word C is a number representative of a signed form of message word M, wherein $C \equiv M^d \pmod{n}$, and wherein said step of signing includes the steps of defining a plurality of k sub-tasks in accordance with $C_1 \equiv M_1^{d_1} \pmod{p_1}$, $C_2 \equiv M_2^{d_2} \pmod{p_2}$,

...

$C_k \equiv M_k^{d_k} \pmod{p_k}$, wherein
$M_1 \equiv M \pmod{p_1}$,
$M_2 \equiv M \pmod{p_2}$,
...
$M_k \equiv M \pmod{p_k}$,
$d_1 \equiv d \pmod{p_1-1}$,
$d_2 \equiv d \pmod{p_2-1}$, and
...
$d_k \equiv d \pmod{p_k-1}$,
where d id defined by
$d \equiv e^{-1} \mod((p_1-1) \cdot (p_2-1) \cdot \ldots \cdot (p_k-1))$, and
e is a number relatively prime to $(p_1-1), (p_2-1), \ldots$, and $(p_k-1)$, solving said sub-tasks to determine results $C_1, C_2, \ldots C_k$, and
combining said results of said sub-tasks to produce said ciphertext word C.

65. A processor-implemented method as recited in claim 64 wherein said step of combining said results of said sub-tasks includes a step of performing a recursive combining process to produce said ciphertext word C.

66. A processor-implemented method as recited in claim 65 wherein said recursive combining process is performed in accordance with $Y_i \equiv Y_{i-1} + [(C_i - Y_{i-1})(w_i^{-1} \mod p_i) \mod p_i] \cdot w_i \mod n$, wherein $2 \leq i \leq k$, and $C = Y_k, Y_1 = C_1$, and $w_i = \prod_{j<i} p_j$.

67. A processor-implemented method as recited in claim 64 wherein said step of combining said results of said sub-tasks includes a step of performing a summation process to produce said signed ciphertext word C.

68. A processor-implemented method as recited in claim 67 wherein said summation process is performed in accordance with $$C \equiv \sum_{i=1}^{k} C_i (w_i^{-1} \mod p_i) w_i \mod n,$$

where $$w_i = \prod_{j \neq i} p_j.$$

69. A processor-implemented method as recited in claim 64 wherein said step of solving said sub-tasks includes processing each of said sub-tasks by an associated one of a plurality of exponentiator units operating substantially simultaneously.

70. A processor-implemented method as recited in claim 64 wherein each of said distinct random prime numbers has the same number of bits.

71. A processor-implemented method as recited in claim 64 wherein the plurality of k sub-tasks are performed in parallel.

72. A processor-implemented method as recited in claim 71 wherein said step of combining uses a form of the Chinese Remainder Theorem (CRT).

73. A digital signature generation system, comprising:
a communication medium;
a processor coupled to said communication medium and operative to transform a transmit message word M to a signed ciphertext word C, and to transmit said signed ciphertext word C on said medium, wherein M corresponds to a number representative of a message, and $0 \leq M \leq n-1$, n being a composite number formed from the product of $p_1 \cdot p_2 \cdot \ldots \cdot p_k$, k wherein k is an integer greater than 2 and $p_1, p_2, \ldots p_k$ are distinct random prime numbers, and wherein the signed ciphertext word C is a number representative of a signed form of said message word M, wherein $C \equiv M^d \pmod{n}$, said processor being operative to transform said transmit message word M to said signal ciphertext word C by performing a digital signature generating process comprising the steps of,
defining a plurality of k sub-tasks in accordance with $C_1 \equiv M_1^{d_1} \pmod{p_1}$, $C_2 \equiv M_2^{d_2} \pmod{p_2}$,

...

$C_k \equiv M_k^{d_k} \pmod{p_k}$, wherein
$M_1 \equiv M \pmod{p_1}$,
$M_2 \equiv M \pmod{p_2}$,
...
$M_k \equiv M \pmod{p_k}$,
$d_1 \equiv d \pmod{p_1-1}$,
$d_2 \equiv d \pmod{p_2-1}$, and
...
$d_k \equiv d \pmod{p_k-1}$,
where d id defined by
$d \equiv e^{-1} \mod(p_1-1) \cdot (p_2-1) \cdot \ldots \cdot (p_k-1))$, and
e is a number relatively prime to $(p_1-1), (p_2-1), \ldots$, and $(p_k-1)$, solving said sub-tasks to determine results $C_1, C_2, \ldots C_k$, and
combining said results of said sub-tasks to produce said ciphertext word C.

74. A digital signature generation system as recited in claim 73 wherein said processor is operative to combine said results of said sub-tasks by performing a recursive combining process to produce said signed ciphertext word C.

75. A digital signature generation system as recited in claim 74 wherein said processor is operative to perform said recursive combining process in accordance with $$Y_i \equiv Y_{i-1} + [(M_i' - Y_{i-1})~(w_i^{-1}~mod~p_i)~mod~p_i] \cdot w_i~mod~n,$$

wherein $2 \leq i \leq k$, and $$C = Y_k, Y_1 = C_1, \text{ and } w_i = \prod_{j<i} p_j.$$

76. A digital signature generation system as recited in claim 73 wherein said processor is operative to combine said results of said sub-tasks by performing a summation process to produce said signed message word C.

77. A digital signature system as recited in claim 76 wherein said processor is operative to perform said summation process in accordance with $$C \equiv \sum_{i=1}^{k} C_i(w_i^{-1} mod p_i) w_i mod n,$$

where $$w_i = \prod_{j \neq i} p_j.$$

78. A digital signature generation system as recited in claim 73 wherein said step of solving said sub-tasks includes processing each of said sub-tasks by an associated one of a plurality of exponentiator units operating substantially simultaneously.

79. A digital signature generation system as recited in claim 73 wherein each of said distinct random prime numbers has the same number of bits.

80. A digital signature generation system as recited in claim 73 wherein the plurality of k sub-tasks are performed in parallel.

81. A digital signature generation system as recited in claim 80 wherein said step of combining uses a form of the Chinese Remainder Theorem (CRT).

82. A processor-implemented digital signature process, comprising the steps of:

signing a plaintext message word M to create a signed ciphertext word C, wherein M corresponds to a number representative of a message and wherein $$0 \leq M \leq n-1,$$

wherein n is a composite number formed by the product of $p_1 \cdot p_2 \cdot \ldots \cdot p_k$, k is an integer greater than 2 and $p_1$, $p_2$, ... $p_k$ are distinct random prime numbers, C is a number representative of a signed form of message word M, and wherein said encoding step comprises transforming said message word M to said ciphertext word C, whereby $$C \equiv M^d (mod~n),$$

wherein d is defined by $$d \equiv e^{-1}~mod(p_1-1) \cdot (p_2-1) \cdot \ldots \cdot (p_k-1)), \text{ and}$$

e is a number relatively prime to $(p_1-1)$, $(p_2-1)$, ..., and $(p_k-1)$; and verifying said ciphertext word C to a receive message word M' by performing the steps of, defining a plurality of k sub-tasks in accordance with $$M_1' \equiv C_1^{d_1}~(mod~p_1),$$

$$M_2' \equiv C_2^{d_2}~(mod~p_2),$$

. . .

$$M_k' \equiv C_k^{d_k}~(mod~p_k),$$

wherein
$C_1 \equiv C(mod~p_1)$,
$C_2 \equiv C(mod~p_2)$,
. . .
$C_k \equiv C(mod~p_k)$,
$e_1 \equiv e(mod(p_1-1))$,
$e_2 \equiv e(mod(p_2-1))$, and
. . .
$e_k \equiv e(mod(p_k-1))$, solving said sub-tasks to determine results $M_1'$, $M_2'$, ... $M_k'$, and combining said results of said sub-tasks to produce said receive message word M', wherein M'=M.

83. A processor-implemented digital signature process as recited in claim 82 wherein said step of combining said results of said sub-tasks includes a step of performing a recursive combining process to produce said receive message word M'.

84. A processor-implemented digital signature process as recited in claim 83 wherein said recursive combining process is performed in accordance with $$Y_i \equiv Y_{i-1} + [(M_i' - Y_{i-1})~(w_i^{-1}~mod~p_i)~mod~p_i] \cdot w_i~mod~n,$$

wherein $2 \leq i \leq k$, and $$M' = Y_k, Y_1 = M_1', \text{ and } w_i = \prod_{j<i} p_j.$$

85. A processor-implemented digital signature process as recited in claim 83 wherein said step of combining said results of said sub-tasks includes a step of performing a summation process to produce said receive message word M'.

86. A processor-implemented digital signature process as recited in claim 85 wherein said summation process is performed in accordance with $$M' \equiv \sum_{i=1}^{k} M_i'(w_i^{-1} mod p_i) w_i mod n,$$

where $$w_i = \prod_{j \neq i} p_j.$$

87. A digital signature process as recited in claim 82 wherein said step of solving said sub-tasks includes processing each of said sub-tasks by an associated one of a plurality of exponentiator units operating substantially simultaneously.

88. A digital signature process as recited in claim 82 wherein each of said distinct random prime numbers has the same number of bits.

89. A digital signature process as recited in claim 82 wherein the plurality of k sub-tasks are performed in parallel.

90. A digital signature process as recited in claim 89 wherein said step of combining uses a form of the Chinese Remainder Theorem (CRT).

91. A processor-implemented method for establishing cryptographic communications, comprising the steps of:
encoding a plaintext message word M to a ciphertext word C, wherein M corresponds to a number representative of a message and wherein $0 \leq M \leq n-1$, wherein n is a composite number formed by the product of $p_1 \cdot p_2 \cdot \ldots \cdot p_k$, k is an integer greater than 2 and $p_1, p_2, \ldots p_k$ are distinct random prime numbers, C is a number representative of an encoded form of message word M, and wherein said encoding step comprises transforming said message word M to said ciphertext word C, whereby $C \equiv M^e \pmod{n}$, and wherein e is a number relatively prime to $(p_1-1)$, $(p_2-1), \ldots$, and $(p_k-1)$; and
decoding said ciphertext word C to a receive message word M', said decoding step being performed using a decryption exponent d that is defined by $d \equiv e^{-1} \bmod ((p_1-1)(p_2-1) \ldots (p_k-1))$, said decoding step including the further steps of,
defining a plurality of k sub-tasks in accordance with $M_1' \equiv C_1^{d_1} \pmod{p_1}$, $M_2' \equiv C_2^{d_2} \pmod{p_2}$,

. . .

$M_k' \equiv C_k^{d_k} \pmod{p_k}$, wherein
$C_1 \equiv C \pmod{p_1}$,
$C_2 \equiv C \pmod{p_2}$,
. . .
$C_k \equiv C \pmod{p_k}$,
$d_1 \equiv d (\bmod (p_1-1))$,
$d_2 \equiv d (\bmod (p_2-1))$, and
. . .
$d_k \equiv d (\bmod (p_k-1))$,
solving said sub-tasks in parallel using a form of the Chinese Remainder Theorem wherein each sub-task is a Chinese Remainder Theorem sub-problem to determine results $M_1', M_2', \ldots M_k'$, and
combining said results of said sub-tasks to produce said receive message word M', wherein M'=M.

92. A cryptographic communications system for establishing communications, comprising:
a communication medium;
encoding means coupled to said communication medium and adapted for transforming a transmit message word M to a ciphertext word C and for transmitting said ciphertext word C on said medium, wherein M corresponds to a number representative of a message, and $0 \leq M \leq n-1$, wherein n is a composite number of the form, $n = p_1 \cdot p_2 \cdot \ldots \cdot p_k$, wherein k is an integer greater than 2 and $p_1, p_2, \ldots p_k$ are distinct random prime numbers, and wherein said ciphertext word C corresponds to a number representative of an enciphered form of said message word M and corresponds to $C \equiv M^e \pmod{n}$, wherein e is a number relatively prime to $(p_1-1)$, $(p_2-1), \ldots$, and $(p_k-1)$; and
decoding means communicatively coupled with said communication medium for receiving said ciphertext word C via said medium, said decoding means being operative to perform a decryption process for transforming said ciphertext word C to a receive message word M', wherein M' corresponds to a number representative of a deciphered form of C, said decryption process using a decryption exponent d that is defined by $d \equiv e^{-1} \bmod((p_1-1)(p_2-1) \ldots (p_k-1))$, said decryption process including the steps of
defining a plurality of k sub-tasks in accordance with $M_1' \equiv C_1^{d_1} \pmod{p_1}$, $M_2' \equiv C_2^{d_2} \pmod{p_2}$,

. . .

$M_k' \equiv C_k^{d_k} \pmod{p_k}$, wherein
$C_1 \equiv C \pmod{p_1}$,
$C_2 \equiv C \pmod{p_2}$,
. . .
$C_k \equiv C \pmod{p_k}$,
$d_1 \equiv d (\bmod(p_1-1))$,
$d_2 \equiv d (\bmod(p_2-1))$, and
. . .
$d_k \equiv d (\bmod(p_k-1))$,
solving said sub-tasks in parallel using a form of the Chinese Remainder Theorem wherein each sub-task is a Chinese Remainder Theorem sub-problem to determine results $M_1', M_2', \ldots M_k'$, and
combining said results of said sub-tasks to produce said receive message word M', wherein M'=M.

93. A processor-implemented method for establishing cryptographic communications, comprising the steps of:
encoding a plaintext message word M to a ciphertext word C, wherein M corresponds to a number representative of a message, and $0 \leq M \leq n-1$, n being a composite number formed from the product of $p_1 \cdot p_2 \cdot \ldots \cdot p_k$, wherein k is an integer greater than 2 and $p_1, p_2, \ldots p_k$ are distinct random prime numbers, and wherein the ciphertext word C is a number representative of an encoded form of message word M, wherein said step of encoding includes the steps of defining a plurality of k sub-tasks in accordance with $$C_1 \equiv M_1^{e_1} (\text{mod } p_1),$$

$$C_2 \equiv M_2^{e_2} (\text{mod } p_2),$$

. . .

$$C_k \equiv M_k^{e_k} (\text{mod } p_k),$$

wherein
$M_1 \equiv M(\text{mod } p_1)$,
$M_2 \equiv M(\text{mod } p_2)$,
. . .
$M_k \equiv M(\text{mod } p_k)$,
$e_1 \equiv e(\text{mod}(p_1-1))$,
$e_2 \equiv e(\text{mod}(p_2-1))$, and
. . .
$e_k \equiv e(\text{mod}(p_k-1))$, wherein e is a number relatively prime to $(p_1-1)$, $(p_2-1)$, . . . , and $(p_k-1)$, solving said sub-tasks in parallel using a form of the Chinese Remainder Theorem wherein each sub-task is a Chinese Remainder Theorem sub-problem to determine results $C_1, C_2, \ldots C_k$, and combining said results of said sub-tasks to produce said ciphertext word C.

94. A cryptographic communications system for establishing communications, comprising:

a communication medium;

processor coupled to said communication medium and operative to transform a transmit message word M to a ciphertext word C and to transmit said ciphertext word C on said medium, wherein M corresponds to a number representative of a message, and $0 \leq M \leq n-1$, n being a composite number formed from the product of $p_1 \cdot p_2 \cdot \ldots \cdot p_k$ wherein k is an integer greater than 2 and $p_1, p_2, \ldots,$ and $p_k$ are distinct random prime numbers, and wherein the ciphertext word C is a number representative of an encoded form of message word M, said processor being operative to transform said transmit message word M to said ciphertext word C by performing an encoding process comprising the steps of defining a plurality of k sub-tasks in accordance with $$C_1 \equiv M_1^{e_1} (\text{mod } p_1),$$

$$C_2 \equiv M_2^{e_2} (\text{mod } p_2),$$

. . .

$$C_k \equiv M_k^{e_k} (\text{mod } p_k),$$

wherein
$M_1 \equiv M(\text{mod } p_1)$,
$M_2 \equiv M(\text{mod } p_2)$,
. . .
$M_k \equiv M(\text{mod } p_k)$,
$e_1 \equiv e(\text{mod}(p_1-1))$,
$e_2 \equiv e(\text{mod}(p_2-1))$, and
. . .
$e_k \equiv e(\text{mod}(p_k-1))$, wherein e is a number relatively prime to $(p_1-1)$, $(p_2-1)$, . . . , and $(p_k-1)$, solving said sub-tasks in parallel using a form of the Chinese Remainder Theorem wherein each sub-task is a Chinese Remainder Theorem sub-problem to determine results $C_1, C_2, \ldots C_k$, and combining said results of said sub-tasks to produce said ciphertext word C.

95. A processor-implemented method for establishing cryptographic communications, comprising the steps of:

decoding a ciphertext word C to a message word M, wherein M corresponds to a number representative of a message and wherein $0 \leq M \leq n-1$, wherein n is a composite number formed by the product of $p_1 \cdot p_2 \cdot \ldots \cdot p_k$, k is an integer greater than 2 and $p_1, p_2, \ldots p_k$ are distinct random prime numbers, C is a number representative of an encoded form of message word M that is encoded by transforming said message word M to said ciphertext word C whereby $$C \equiv M^e (\text{mod } n),$$

and wherein e is a number relatively prime to $(p_1-1)$, $(p_2-1)$, . . . , and $(p_k-1)$;

said decoding step being performed using a decryption exponent d that is defined by $$d \equiv e^{-1} \bmod((p_1-1)(p_2-1) \ldots (p_k-1)),$$

wherein said step of decoding includes the steps of defining a plurality of k sub-tasks in accordance with $$M_1 \equiv C_1^{d_1} (\text{mod } p_1),$$

$$M_2 \equiv C_2^{d_2} (\text{mod } p_2),$$

. . .

$$M_k \equiv C_k^{d_k} (\text{mod } p_k),$$

wherein
$C_1 \equiv C(\text{mod } p_1)$,
$C_2 \equiv C(\text{mod } p_2)$,
. . .
$C_k \equiv C(\text{mod } p_k)$,
$d_1 \equiv d(\text{mod}(p_1-1))$,
$d_2 \equiv d(\text{mod}(p_2-1))$, and
. . .
$d_k \equiv d(\text{mod}(p_k-1))$, solving said sub-tasks in parallel using a form of the Chinese Remainder Theorem wherein each sub-task is a Chinese Remainder Theorem sub-problem to determine results $M_1, M_2, \ldots M_k$, and combining said results of said sub-tasks to produce said message word M.

96. A cryptographic communications system for establishing communications, comprising:

a communication medium;

processor communicatively coupled with said communication medium for receiving a ciphertext word C via said medium, and being operative to transform said ciphertext word C to a receive message word M', wherein a message M corresponds to a number representative of a message and wherein, $0 \leq M \leq n-1$, wherein n is a composite number formed by the product of $p_1 \cdot p_2 \cdot \ldots \cdot p_k$, k is an integer greater than 2 and $p_1, p_2, \ldots, p_k$ are distinct random prime numbers, and wherein said ciphertext word C is a number representative of an encoded form of said message word M that is encoded by transforming M to said ciphertext word C whereby, $$C \equiv M^e (\mod n),$$

and wherein e is a number relatively prime to $(p_1-1)$, $(p_2-1)$, ..., and $(p_k-1)$;

said decoding processor being operative to perform a decryption process using a decryption exponent d that is defined by $$d \equiv e^{-1} \mod((p_1-1)(p_2-1) \ldots (p_k-1)),$$

said decryption process including the steps of
defining a plurality of k sub-tasks in accordance with $$M_1' \equiv C_1^{d_1} (\mod p_1),$$

$$M_2' \equiv C_2^{d_2} (\mod p_2),$$

...

$$M_k' \equiv C_k^{d_k} (\mod p_k),$$

wherein
$C_1 \equiv C (\mod p_1)$,
$C_2 \equiv C (\mod p_2)$,
...
$C_k \equiv C (\mod p_k)$,
$d_1 \equiv d (\mod (p_1-1))$,
$d_2 \equiv d (\mod (p_2-1))$, and
...
$d_k \equiv d (\mod (p_k-1))$,
solving said sub-tasks in parallel using a form of the Chinese Remainder Theorem wherein each sub-task is a Chinese Remainder Theorem sub-problem to determine results $M_1'$, $M_2'$, ... $M_k'$, and
combining said results of said sub-tasks to produce said receive message word M', wherein M'=M.

97. A processor-implemented method for generating a digital signature, comprising the steps of:
signing a plaintext message word M to create a signed ciphertext word C, wherein M corresponds to a number representative of a message, and $$0 \leq M \leq n-1,$$

n being a composite number formed from the product of $p_1 \cdot p_2 \cdot \ldots \cdot p_k$, wherein k is an integer greater than 2 and $p_1, p_2, \ldots p_k$ are distinct random prime numbers, and wherein the signed ciphertext word C is a number representative of a signed form of message word M, wherein $$C \equiv M^d (\mod n), \text{ and}$$

wherein said step of signing includes the steps of
defining a plurality of k sub-tasks in accordance with $$C_1 \equiv M_1^{d_1} (\mod p_1),$$

$$C_2 \equiv M_2^{d_2} (\mod p_2),$$

...

$$C_k \equiv M_k^{d_k} (\mod p_k),$$

wherein
$M_1 \equiv M (\mod p_1)$,
$M_2 \equiv M (\mod p_2)$,
...
$M_k \equiv M (\mod p_k)$,
$d_1 \equiv d (\mod (p_1-1))$,
$d_2 \equiv d (\mod (p_2-1))$, and
...
$d_k \equiv d (\mod (p_k-1))$,
where d id defined by $$d \equiv e^{-1} \mod((p_1-1) \cdot (p_2-1) \cdot \ldots \cdot (p_k-1)), \text{ and}$$

e is a number relatively prime to $(p_1-1)$, $(p_2-1)$, ..., and $(p_k-1)$, solving said sub-tasks in parallel using a form of the Chinese Remainder Theorem wherein each sub-task is a Chinese Remainder Theorem sub-problem to determine results $C_1, C_2, \ldots C_k$, and
combining said results of said sub-tasks to produce said ciphertext word C.

98. A digital signature generation system, comprising:
a communication medium;
a processor coupled to said communication medium and operative to transform a transmit message word M to a signed ciphertext word C, and to transmit said signed ciphertext word C on said medium, wherein M corresponds to a number representative of a message, and $$0 \leq M \leq n-1,$$

n being a composite number formed from the product of $p_1 \cdot p_2 \cdot \ldots \cdot p_k$, wherein k is an integer greater than 2 and $p_1, p_2, \ldots p_k$ are distinct random prime numbers, and wherein the signed ciphertext word C is a number representative of a signed form of said message word M, wherein $$C \equiv M^d (\mod n),$$

said processor being operative to transform said transmit message word M to said signed ciphertext word C by performing a digital signature generating process comprising the steps of;
defining a plurality of k sub-tasks in accordance with $$C_1 \equiv M_1^{d_1} (\mod p_1),$$

$$C_2 \equiv M_2^{d_2} (\mod p_2),$$

...

$$C_k \equiv M_k^{d_k} (\mod p_k),$$

wherein
$M_1 \equiv M (\mod p_1)$,
$M_2 \equiv M (\mod p_2)$,
...
$M_k \equiv M (\mod p_k)$,
$d_1 \equiv d (\mod (p_1-1))$,
$d_2 \equiv d (\mod (p_2-1))$, and
...
$d_k \equiv d (\mod (p_k-1))$,
where d id defined by $$d \equiv e^{-1} \mod((p_1-1) \cdot (p_2-1) \cdot \ldots \cdot (p_k-1)), \text{ and}$$

e is a number relatively prime to $(p_1-1)$, $(p_2-1)$, ..., and $(p_k-1)$, solving said sub-tasks in parallel using a form of the Chinese Remainder Theorem wherein each sub-task is a Chinese Remainder Theorem sub-problem to determine results $C_1, C_2, \ldots C_k$, and
combining said results of said sub-tasks to produce said ciphertext word C.

99. A processor-implemented digital signature process, comprising the steps of:
signing a plaintext message word M to create a signed ciphertext word C, wherein M corresponds to a number representative of a message and wherein $$0 \leq M \leq n-1,$$

wherein n is a composite number formed by the product of $p_1 \cdot p_2 \cdot \ldots \cdot p_k$, k is an integer greater than 2 and $p_1, p_2, \ldots p_k$ are distinct random prime numbers, C is a number representative of a signed form of message word M, and wherein said encoding step comprises transforming said message word M to said ciphertext word C, whereby $$C \equiv M^d \pmod{n},$$

wherein d is defined by $$d \equiv e^{-1} mod((p_1-1) \cdot (p_2-1) \cdot \ldots \cdot (p_k-1)), \text{ and}$$

e is a number relatively prime to $(p_1-1)$, $(p_2-1)$, ..., and $(p_k-1)$; and verifying said ciphertext word C to a receive message word M' by performing the steps of, defining a plurality of k sub-tasks in accordance with $$M_1' \equiv C_1^{e1} \pmod{p_1},$$

$$M_2' \equiv C_2^{e2} \pmod{p_2},$$

. . .

$$M_k' \equiv C_k^{ek} \pmod{p_k},$$

wherein
$C_1 \equiv C \pmod{p_1}$,
$C_2 \equiv C \pmod{p_2}$,
. . .
$C_k \equiv C \pmod{p_k}$,
$e_1 \equiv e \pmod{p_1-1}$,
$e_2 \equiv e \pmod{p_2-1}$, and
. . .
$e_k \equiv e \pmod{p_k-1}$, solving said sub-tasks in parallel using a form of the Chinese Remainder Theorem wherein each sub-task is a Chinese Remainder Theorem sub-problem to determine results $M_1'$, $M_2'$, ... $M_k'$, and combining said results of said sub-tasks to produce said receive message word M', wherein M'=M.

100. A digital signature system, comprising:

a communication medium;

digital signature generating means coupled to said communication medium and adapted for transforming a message word M to a signed ciphertext word C and for transmitting said signed ciphertext word C on said medium, wherein M corresponds to a number representative of a message, and $$0 \leq M \leq n-1,$$

wherein n is a composite number of the form $$n = p_1 \cdot p_2 \cdot \ldots \cdot p_k,$$

wherein k is an integer greater than 2 and $p_1$, $p_2$, ... $p_k$ are distinct random prime numbers, and wherein said signed ciphertext word C corresponds to a number representative of a signed form of said message word M and corresponds to $$C \equiv M^d \pmod{n},$$

wherein d is defined by $$d \equiv e^{-1} \, mod((p_1-1) \cdot (p_2-1) \cdot \ldots \cdot (p_k-1)), \text{ and}$$

e is a number relatively prime to $(p_1-1)$, $(p_2-1)$, ..., and $(p_k-1)$; and digital signature verification means communicatively coupled with said communication medium for receiving said signal ciphertext word C via said medium, and being operative to verify said signed ciphertext word C by performing the steps of, defining a plurality of k sub-tasks in accordance with $$M_1' \equiv C_1^{e1} \pmod{p_1},$$

$$M_2' \equiv C_2^{e2} \pmod{p_2},$$

. . .

$$M_k' \equiv C_k^{ek} \pmod{p_k},$$

wherein
$C_1 \equiv C \pmod{p_1}$,
$C_2 \equiv C \pmod{p_2}$,
. . .
$C_k \equiv C \pmod{p_k}$,
$e_1 \equiv e \pmod{p_1-1}$,
$e_2 \equiv e \pmod{p_2-1}$, and
. . .
$e_k \equiv e \pmod{p_k-1}$, solving said sub-tasks in parallel using a form of the Chinese Remainder Theorem to determine results $M_1'$, $M_2'$, ... $M_k'$, and combining said results of said sub-tasks to produce said receive message word M', wherein M'=M.

* * * * *

UNITED STATES PATENT AND TRADEMARK OFFICE
CERTIFICATE OF CORRECTION

PATENT NO. : 7,231,040 B1
APPLICATION NO. : 09/328726
DATED : June 12, 2007
INVENTOR(S) : Thomas Collins et al.

It is certified that error appears in the above-identified patent and that said Letters Patent is hereby corrected as shown below:

In column 2, line 27, after "is" insert -- a --.

In column 2, line 32 (equation 6), delete "$e \cdot d \equiv 1(\mod(\operatorname{lcm}(p-1), (q-1))))$" and insert -- $e.d \equiv 1 (\mod(\operatorname{lcm}((p-1), (q-1))))$ --, therefor.

In column 7, line 6, above "k is the number" insert -- where $w_i = \prod_{j \neq i} p_j$, and --.

In column 10, line 39, above "Each block M" delete "$0 \leq M \leq N-1$."

In column 12, line 20, in Claim 10, after "$p_2,...$" delete "and".

In column 13, line 49, in Claim 19, delete "steps" and insert -- step --, therefor.

In column 15, line 19, in Claim 28, after "of" delete ":".

In column 15, line 46, in Claim 29, after "claim 28" delete ",".

In column 16, line 62, in Claim 37, delete "$M_1' \equiv C_1^{d1}(\mod p_1),$" and insert -- $M_1' \equiv C_1^{e1}(\mod p_1),$ --, therefor.

In column 16, line 64, in Claim 37, delete "$M_2' \equiv C_2^{d2}(\mod p_2),$" and insert -- $M_2' \equiv C_2^{e2}(\mod p_2),$ --, therefor.

In column 16, line 67, in Claim 37, delete "$M_k' \equiv C_k^{dk}(\mod p_k),$" and insert -- $M_k' \equiv C_k^{ek}(\mod p_k),$ --, therefor.

In column 19, line 48, in Claim 56, after "wherein" insert -- , --.

In column 19, line 53, in Claim 56, after "$p_2,...$" insert -- , --.

In column 19, line 67, in Claim 56, after "with" insert -- , --.

In column 20, line 62, in Claim 64, delete "steps" and insert -- step --, therefor.

UNITED STATES PATENT AND TRADEMARK OFFICE
CERTIFICATE OF CORRECTION

PATENT NO. : 7,231,040 B1
APPLICATION NO. : 09/328726
DATED : June 12, 2007
INVENTOR(S) : Thomas Collins et al.

It is certified that error appears in the above-identified patent and that said Letters Patent is hereby corrected as shown below:

In column 22, line 14, in Claim 70, delete "numbers" and insert -- number --, therefor.

In column 22, line 15, in Claim 70, delete "number" and insert -- numbers --, therefor.

In column 22, line 33, in Claim 73, after "$p_k$" insert -- , --.

In column 22, line 39, in Claim 73, delete "signal" and insert -- signed --, therefor.

In column 22, line 42, in Claim 73, after "with" insert -- , --.

In column 22, line 60 in Claim 73, delete "$d \equiv e^{-1} \mod(p_1-1)(p_2-1) \ldots (p_k-1))$" and insert -- $d \equiv e^{-1} \mod((p_1-1)(p_2-1) \ldots (p_k-1))$ --, therefor.

In column 23, line 61, in Claim 82, after "$p_2,\ldots$" insert -- , --.

In column 23, line 66, in Claim 82, delete "C, whereby" and insert -- C whereby, --, therefor.

In column 24, line 2, in Claim 82, delete "$d \equiv e^{-1} \mod(p_1-1)(p_2-1) \ldots (p_k-1))$" and insert -- $d \equiv e^{-1} \mod((p_1-1)(p_2-1) \ldots (p_k-1))$ --, therefor.

In column 24, line 9, in Claim 82, delete "$M_1' \equiv C_1^{d1}(\mod p_1),$" and insert -- $M_1' \equiv C_1^{e1}(\mod p_1),$ --, therefor.

In column 24, line 11, in Claim 82, delete "$M_2' \equiv C_2^{d2}(\mod p_2),$" and insert -- $M_2' \equiv C_2^{e2}(\mod p_2),$ --, therefor.

In column 24, line 14, in Claim 82, delete "$M_k' \equiv C_k^{dk}(\mod p_k),$" and insert -- $M_k' \equiv C_k^{ek}(\mod p_k),$ --, therefor.

In column 25, line 22, in Claim 91, after "$p_2,\ldots$" insert -- , --.

In column 26, line 9, in Claim 92, after "$p_2,\ldots$" insert --, --.

In column 26, line 59, in Claim 93, delete "steps" and insert -- step --, therefor.

UNITED STATES PATENT AND TRADEMARK OFFICE
CERTIFICATE OF CORRECTION

PATENT NO. : 7,231,040 B1
APPLICATION NO. : 09/328726
DATED : June 12, 2007
INVENTOR(S) : Thomas Collins et al.

It is certified that error appears in the above-identified patent and that said Letters Patent is hereby corrected as shown below:

In column 26, line 67, in Claim 93, after "$p_2,...$" insert -- , --.

In column 27, line 33, in Claim 94, after "C" insert -- , --.

In column 27, line 40, in Claim 94, after "$p_2,...$" delete "and".

In column 28, line 15, in Claim 95, after "$p_2,...$" insert -- , --.

In column 29, line 8, in Claim 96, after "said" delete "decoding".

In column 29, line 14, in Claim 96, after "with" insert -- , --.

In column 29, line 37, in Claim 97, delete "steps" and insert -- step --, therefor.

In column 29, line 45, in Claim 97, after "$p_2,...$" insert -- , --.

In column 30, line 21, in Claim 98, after "$p_k,$" insert -- k --.

In column 30, line 22, in Claim 98, after "$p_2,...$" insert -- , --.

In column 30, line 22, in Claim 98, after "$p_k,...$" insert -- , --.

In column 30, line 31, in Claim 98, delete "of;" and insert -- of, --, therefor.

In column 30, line 32, in Claim 98, after "with" insert -- , --.

In column 30, line 67, in Claim 99, after "$p_2,...$" insert -- , --.

In column 31, line 4, in Claim 99, delete "C, whereby" and insert -- C whereby, --, therefor.

In column 32, line 7, in Claim 100, after "$p_2,...$" insert -- , --.

UNITED STATES PATENT AND TRADEMARK OFFICE
CERTIFICATE OF CORRECTION

| | | |
|---|---|---|
| PATENT NO. | : 7,231,040 B1 | |
| APPLICATION NO. | : 09/328726 | |
| DATED | : June 12, 2007 | |
| INVENTOR(S) | : Thomas Collins et al. | |

It is certified that error appears in the above-identified patent and that said Letters Patent is hereby corrected as shown below:

In column 32, line 20, in Claim 100, delete "signal" and insert -- signed --, therefor.

Signed and Sealed this

Second Day of September, 2008

JON W. DUDAS
*Director of the United States Patent and Trademark Office*